Dec. 9, 1941.  J. M. JACOBSON  2,265,967
AIRCRAFT CONSTRUCTION
Filed April 26, 1939  3 Sheets-Sheet 1
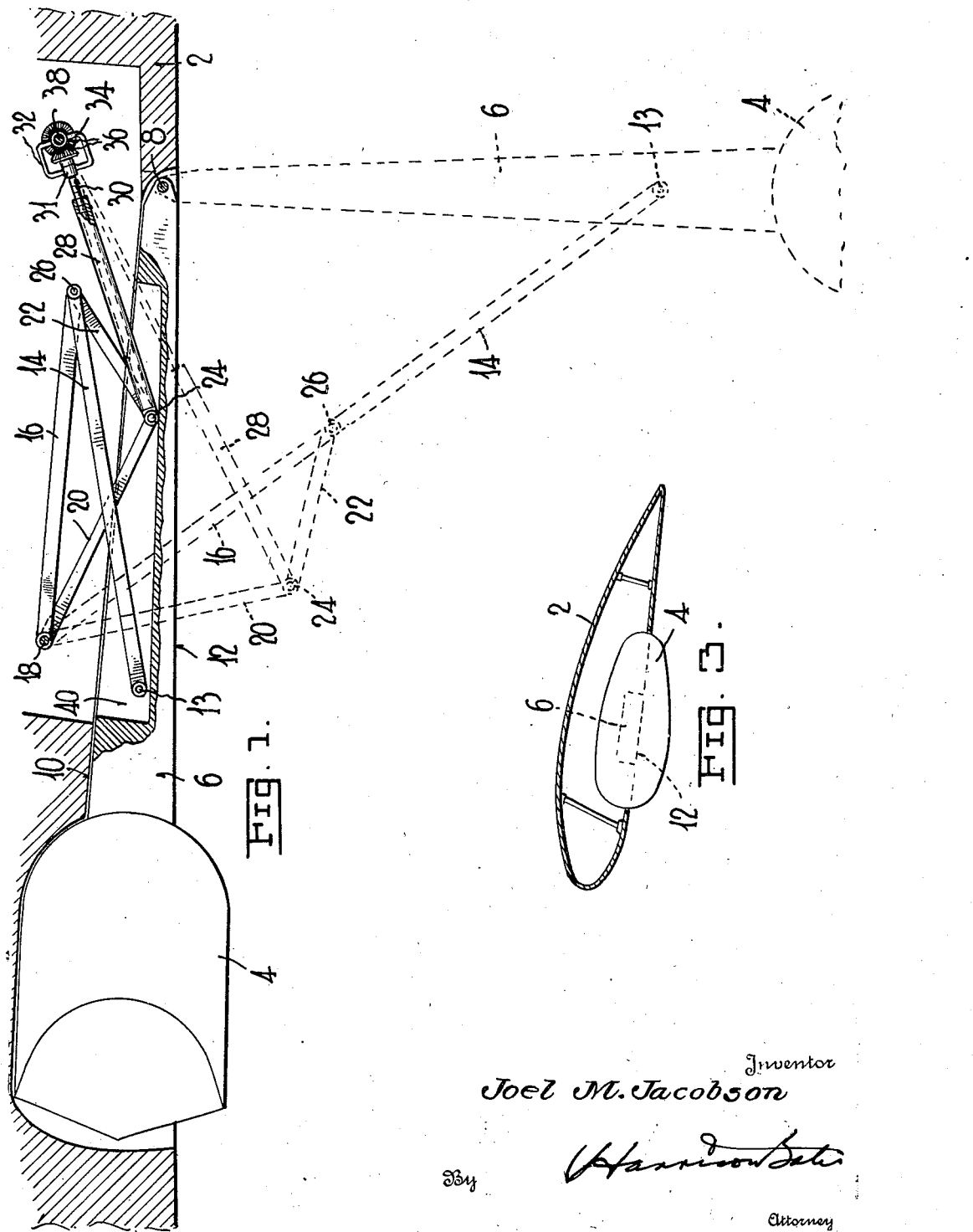
Inventor
Joel M. Jacobson
By
Attorney

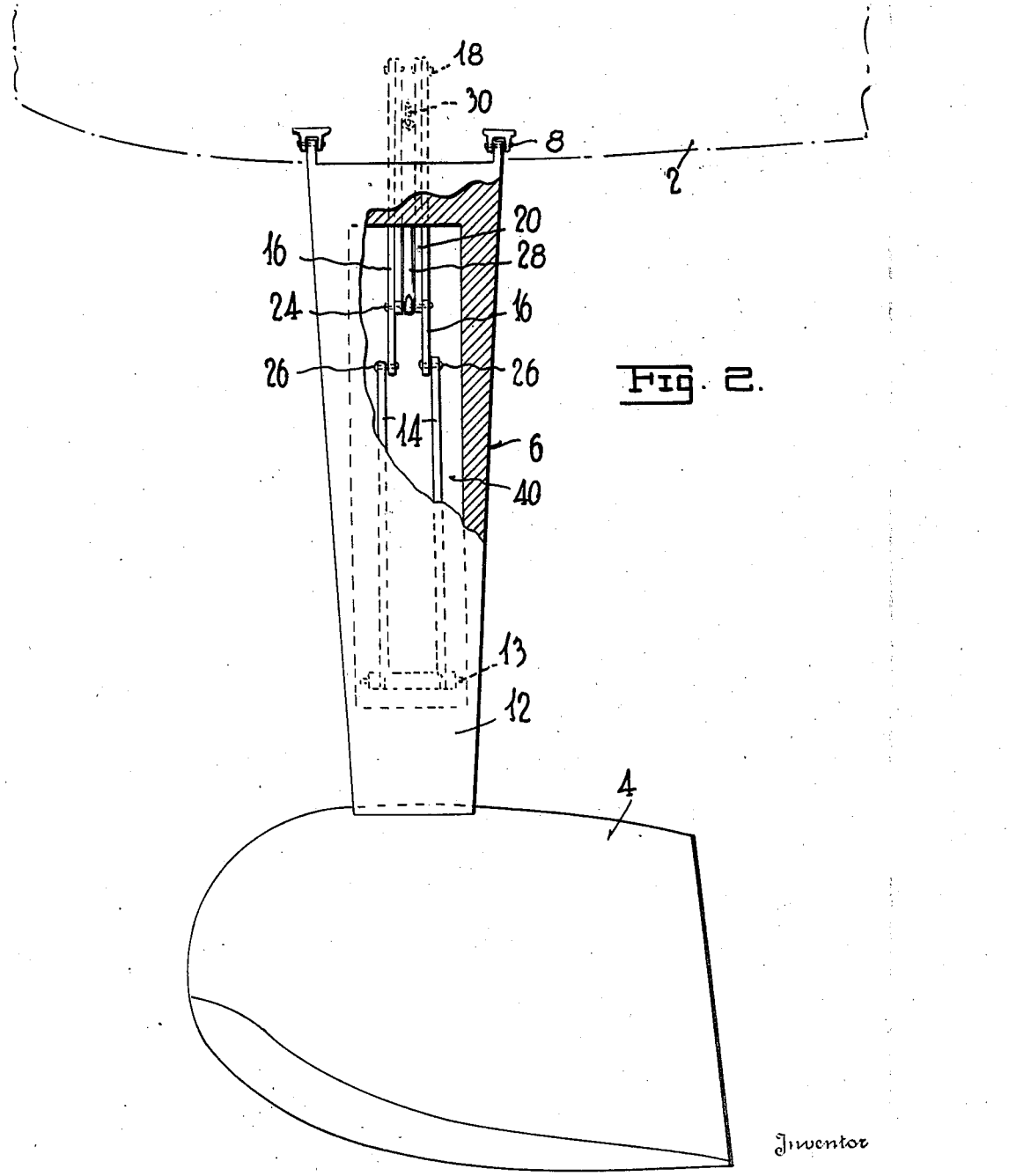

Dec. 9, 1941. J. M. JACOBSON 2,265,967
AIRCRAFT CONSTRUCTION
Filed April 26, 1939 3 Sheets-Sheet 3
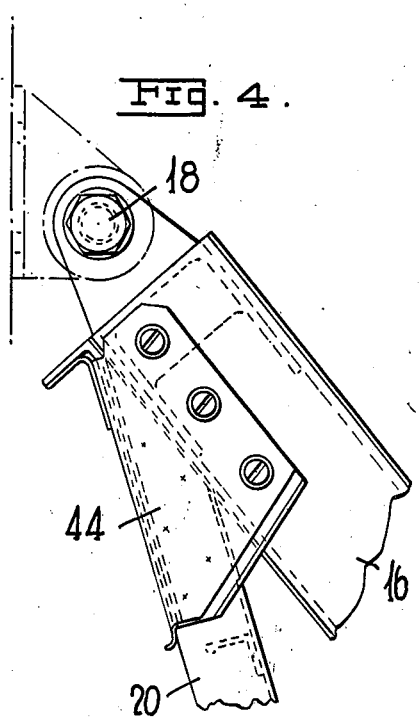
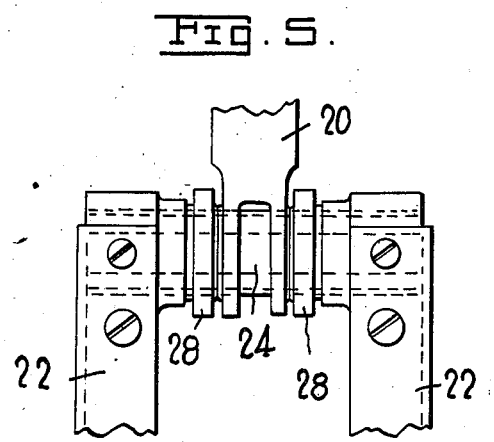
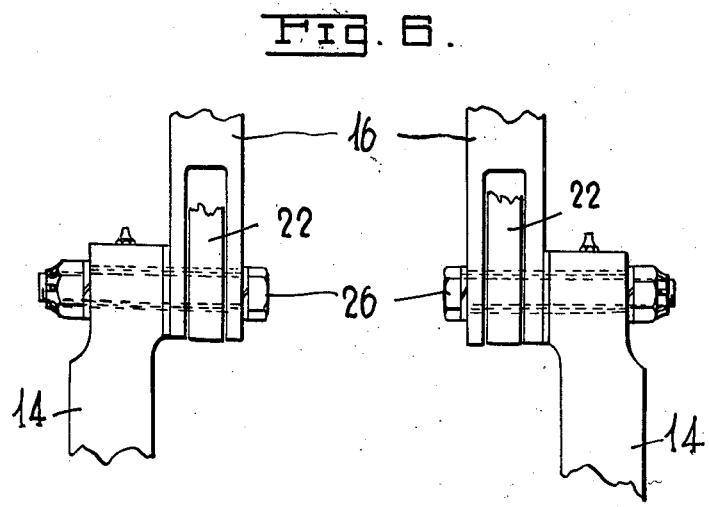
Inventor
Joel M. Jacobson,
By
Attorney Patented Dec. 9, 1941

2,265,967

UNITED STATES PATENT OFFICE 2,265,967

AIRCRAFT CONSTRUCTION

Joel M. Jacobson, Baltimore, Md., assignor to The Glenn L. Martin Company, Baltimore, Md.

Application April 26, 1939, Serial No. 270,049

8 Claims. (Cl. 244—102)

The invention relates to aircraft construction, and particularly to a retractable float arrangement for flying boats.

The primary object of the invention is to provide a float mounting capable of retraction into the aircraft, without causing any substantial increase in the aerodynamic resistance of the parts when the float is in retracted position.

A further object of the invention is to provide a float of which the operating mechanism requires relatively little space because of the interfolding and telescoping of different parts thereof.

Still another object of the invention is to provide a float moving mechanism in which the operating links are aligned when the float is in its operative position.

More especially, in reducing aerodynamic resistance, the invention contemplates the mounting of the float upon an arm or strut which may be retracted into the lower surface of a wing, or other aircraft surface, without leaving any gap or projection in the surface, and without the use of covers or other parts for closing the gap in the surface into which the sustaining strut moves, with the remaining operating mechanism folding into this arm.

More particularly, this is accomplished by providing the strut with a surface which, when the strut is in retracted position, is flush with the surrounding surfaces of the wing or the like.

Further objects and advantages of the invention will appear more fully from the following description particularly when taken in conjunction with the accompanying drawings which form a part thereof. In the drawings:

Fig. 1 shows in front elevation a retractable float mechanism embodying my invention;

Fig. 2 is an end view thereof;

Fig. 3 is a vertical cross section through the wing showing the float in retracted position; and Figs. 4 to 6 are detail views of the connections of the strut operating mechanism.

As shown in Figs. 1 to 3, the invention contemplates the mounting of the float on an airplane wing 2 of any suitable nature. Of course the same type of wing is used on the other side of the body of the aircraft, which is located to the left of Fig. 1.

The float proper is indicated at 4 and may be of any suitable construction, preferably being streamlined so as to reduce its resistance in the water, as well as to reduce the aerodynamic resistance of that small portion which projects from the wing when the float is retracted, as will be explained below.

The float is mounted rigidly on the end of a strut 6 which is pivoted at 8 on the frame of the aircraft wing. The strut is arranged to swing into a recess 10 in the lower surface of the wing, as shown in solid lines in Fig. 1. The strut is so shaped as to fit into this recess, and the outer surface 12 of the strut is given the shape which that portion of the lower wing surface which is removed to form the recess 10 would have. Thus, when the strut is swung upwardly, its lower surface 12 constitutes a continuation of the surrounding part of the lower surface of the wing 2 and does not increase the aerodynamic resistance, or cause any eddy currents or turbulence as would a gap in the wing surface.

The strut 6 may be moved by any suitable mechanism, but preferably by that shown in the drawings. Pivoted at 13 to an intermediate part of the strut 6 is a link 14, the other end of which is likewise pivotally connected at 26 to a link 16 pivoted at 18 to the wing 2. Two other links 20 and 22 are pivoted together at 24 and are likewise secured at 18 and 26 respectively to the two ends of link 16. Links 16, 20 and 22 thus form an indeformable triangle.

The movement of link 16 is caused by a link 28 pivoted at 24, this link being internally screw threaded and being engaged by a screw or threaded shaft 30 mounted by bearing 31 in a frame 32 pivoted at 34 to the wing 2. The threaded shaft 30 may be driven in any suitable manner, as for instance by bevel gears 36 from a shaft 38, which may be rotated in any suitable manner.

It will be noted that when the float is in the operative position, shown in Fig. 1 in broken lines, struts 14 and 16 are aligned so that forces acting on the float do not react on the operating mechanism 28, 30; nor is there any possibility of the float moving beyond this extreme position.

The strut 6 is provided on its inner face with a recess 40, in the lower end of which is pivoted the end of link 14. Link 14 is formed by two parallel spaced bars 42, 42, in the other ends of which is arranged pivot 26. Link 16 is likewise formed of two bars, the lower ends of which are bifurcated to receive the reduced ends of the two parallel bars which make up link 22. Links 16 and 20 are rigidly held also by a bracing member 44. It is thus evident that links 14 and 22 are capable of collapsing into each other and into the recess 40, so that economy of space is secured.

In order to operate the mechanism it is obvious that the shaft 38 is turned, whereupon the parts move from solid line position shown in Fig. 1 to the broken line position likewise shown therein. In the former position the face 12 of the strut 6 is flush with the lower surface of the wing 2 and forms a portion of the streamlined surface thereof. The float 4 projects only slightly below the wing.

While I have described herein one embodiment of my invention, I wish it to be understood that I do not intend to limit myself thereby except within the scope of the appended claims.

I claim:

1. In an aircraft, a wing having a recess extending longitudinally in the lower surface thereof, a strut pivoted at one end adjacent one end of said recess, a float carried by said strut, said strut and float being movable to a position at least principally within said recess, and said strut having a surface adapted when the strut is within the recess to lie flush with the surrounding portion of the lower surface of the wing, and means for raising and lowering said strut, said last means comprising a link pivoted to said wing, a second link pivoted to said strut and to said first link, and means operatively connecting said first link and said wing for moving said first link about its pivot on the wing, said strut having a recess therein, and said links folding at least partially into said recess when said strut is raised.

2. In an aircraft, a wing having a recess extending longitudinally in the lower surface thereof, a strut pivoted at one end adjacent one end of said recess, a float carried by said strut, said strut and float being movable to a position at least principally within said recess, and said strut having a surface adapted when the strut is within the recess to lie flush with the surrounding portion of the lower surface of the wing, and means for raising and lowering said strut, said last means comprising a link pivoted to said wing, a second link pivoted to said strut and to said first link, and means operatively connecting said first link and said wing for moving said first link about its pivot on the wing, said last means comprising cooperating threaded members one connected to the said first link and the other to the wing, and means for turning one of said members, said first and second links being aligned when said strut is in lowered position, said strut having a recess therein, and said links folding at least partially into said recess when said strut is raised.

3. In an aircraft, a wing having a recess extending longitudinally in the lower surface thereof, a strut pivoted at one end adjacent one end of said recess, a float carried by said strut, said strut being movable to a position at least principally within said recess, and said strut having a surface adapted when the strut is within the recess to lie flush with the surrounding portion of the lower surface of the wing, and means for raising and lowering said strut, said last means comprising a pair of parallel links pivoted to said wing, a second pair of parallel links pivoted to said strut and to said first links, and means operatively connecting said first links and said wing for moving said first links about their pivots on the wing, said strut having a recess therein, and said links folding at least partially into said recess.

4. In an aircraft, a wing having a recess extending longitudinally in the lower surface thereof, a strut pivoted at one end adjacent one end of said recess, a float carried by said strut, said strut being movable to a position at least principally within said recess, and said strut having a surface adapted when the strut is within the recess to lie flush with the surrounding portion of the lower surface of the wing, and means for raising and lowering said strut, said last means comprising a link pivoted to said wing, a second link pivoted to said strut and to said first link, and means operatively connecting a point of said first link remote from its pivot to the second link and said wing for moving said first link about its pivot on the wing, said strut having a recess therein, and said links folding at least partially into said recess when said strut is raised.

5. In an aircraft, a wing having a recess extending longitudinally in the lower surface thereof, a strut pivoted at one end adjacent one end of said recess, a float carried by said strut, said strut being movable to a position at least principally within said recess, and said strut having a surface adapted when the strut is within the recess to lie flush with the surrounding portion of the lower surface of the wing, and means for raising and lowering said strut, said last means comprising a triangular link pivoted at one corner to said wing, a second link pivoted to said strut and to a second corner of said first link, and means operatively connecting the third corner of said first link and said wing for moving said link about its pivot on the wing, said strut having a recess therein, and said links folding at least partially into said recess when the strut is raised.

6. In an aircraft, a wing having a recess extending longitudinally in the lower surface thereof, a strut pivoted at one end adjacent one end of said recess, a float carried by said strut, said strut being movable to a position at least principally within said recess, and said strut having a surface adapted when the strut is within the recess to lie flush with the surrounding portion of the lower surface of the wing, and means for raising and lowering said strut, said last means comprising a pair of parallel triangular links each pivoted at one corner to said wing, a second pair of parallel links each pivoted to said strut and to a second corner of one of said first pair of links, and means operatively connecting the third corner of each of said first pair of links and said wing for moving said first links about their pivots on the wing, said strut having recess therein, and said links folding at least partially into said recess when the strut is raised.

7. In a device as claimed in claim 5, said means for moving said first link comprising cooperating threaded members which are connected to the third corner of said first link and the other to said wing, and means for turning one of said members, said first and second links being aligned when said strut is in lowered position.

8. In a device as claimed in claim 6, said means for moving said first pair of links comprising cooperating threaded members which are connected to the third corner of said first pair of links and the other to the wing, and means for turning one of said members, said first and second pairs of links being aligned when said strut is in lowered position.

JOEL M. JACOBSON.